US008151654B2

(12) United States Patent
Speckhart et al.

(10) Patent No.: US 8,151,654 B2
(45) Date of Patent: *Apr. 10, 2012

(54) SENSOR PAD FOR CONTROLLING AIRBAG DEPLOYMENT AND ASSOCIATED SUPPORT

(75) Inventors: Frank H. Speckhart, Knoxville, TN (US); Robert Scott Baker, Dandridge, TN (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,670

(22) Filed: Oct. 3, 2006

(65) Prior Publication Data

US 2007/0022829 A1 Feb. 1, 2007

Related U.S. Application Data

(63) Continuation of application No. 11/362,745, filed on Feb. 28, 2006, now Pat. No. 7,237,443, which is a continuation of application No. 11/110,718, filed on Apr. 21, 2005, now abandoned, which is a continuation of application No. 10/677,360, filed on Oct. 3, 2003, now abandoned, which is a continuation of application No. 09/988,206, filed on Nov. 19, 2001, now abandoned, which is a continuation of application No. 09/368,113, filed on Aug. 4, 1999, now abandoned, which is a continuation-in-part of application No. 09/146,677, filed on Sep. 3, 1998, now Pat. No. 5,975,568, which is a continuation-in-part of application No. 09/072,833, filed on May 5, 1998, now abandoned, and a continuation-in-part of application No. 29/085,897, filed on Apr. 1, 1998, now Pat. No. Des. 409,935.

(51) Int. Cl.
*G01L 1/08* (2006.01)

(52) U.S. Cl. .............................................. 73/862.454
(58) Field of Classification Search ............ 73/862.454, 73/862.046; 701/45; 180/273
See application file for complete search history.

(56) References Cited

U.S. PATENT DOCUMENTS 566,344 A  8/1896  Sager (Continued)

FOREIGN PATENT DOCUMENTS

DE  3702825  8/1988

(Continued)

OTHER PUBLICATIONS

Kosiak, et al., Interior Sensing for Automotive Occupant Safety, Society of Automotive Engineers, Inc., 2001, 2002-21-0031, 7 pages.

(Continued)

*Primary Examiner* — Lisa M Caputo
*Assistant Examiner* — Octavia Davis-Hollington
(74) *Attorney, Agent, or Firm* — Blank Rome LLP

(57) ABSTRACT

A sensor pad for controlling the deployment of an automobile airbag. Weight sensing pad 10 is used in the seat 54 of an automobile, (not illustrated), to detect the presence of an occupant on the seat. Weight sensing pad 10 is used in conjunction with the vehicle's airbag control module in order to allow deployment of the airbag, in the event of a collision, only if the seat is occupied by a person of a preselected weight. Weight sensing pad 10 is defined by a bladder member 15 having an interior volume subdivided into a plurality of individual cells 42 in fluid communication with each other and that is filled with a non-compressible fluid 18, such as silicon or a silica gel of medium viscosity. A pressure tube 22 is in fluid communication with bladder 15 and is in further fluid communication with a pressure activated electronic transducer 26 which in turn is in electronic communication with the airbag controller 30.

24 Claims, 8 Drawing Sheets

U.S. PATENT DOCUMENTS

| | | | |
|---|---|---|---|
| 735,876 | A | 8/1903 | Holland |
| 1,232,983 | A | 7/1917 | Schenk |
| 1,625,810 | A | 4/1927 | Krichbaum |
| 1,969,929 | A | 8/1934 | Heden |
| D106,986 | S | 9/1937 | Manson |
| 2,105,997 | A | 1/1938 | Church |
| 2,318,492 | A | 5/1943 | Johnson |
| 2,345,421 | A | 3/1944 | Perry |
| 2,684,672 | A | 7/1954 | Summerville |
| 2,703,770 | A | 3/1955 | Melzer |
| 2,842,957 | A | 7/1958 | Bacon, Jr. |
| 3,148,391 | A | 9/1964 | Whitney |
| 3,217,818 | A | 11/1965 | Engelsher et al. |
| 3,326,601 | A | 6/1967 | Vanderbilt |
| 3,330,598 | A | 7/1967 | Whiteside |
| 3,468,311 | A | 9/1969 | Gallagher |
| 3,771,170 | A | 11/1973 | Leon |
| 3,777,175 | A | 12/1973 | Lewis et al. |
| 3,889,529 | A | 6/1975 | Bradley |
| 3,898,472 | A | 8/1975 | Long |
| 3,943,376 | A | 3/1976 | Long |
| 3,980,318 | A | 9/1976 | Balban |
| 3,992,028 | A | 11/1976 | Abe et al. |
| 3,992,946 | A | 11/1976 | Bradley |
| 4,022,146 | A | 5/1977 | Sadler |
| 4,083,127 | A | 4/1978 | Hanson |
| 4,086,910 | A | 5/1978 | Rowland |
| 4,101,869 | A | 7/1978 | Henderson |
| 4,141,770 | A | 2/1979 | Mollura |
| 4,148,855 | A | 4/1979 | Stalter et al. |
| 4,149,541 | A | 4/1979 | Gammons et al. |
| 4,219,090 | A | 8/1980 | Dayton |
| 4,243,248 | A | 1/1981 | Scholz et al. |
| 4,278,971 | A | 7/1981 | Yasui et al. |
| 4,279,044 | A | 7/1981 | Douglas |
| 4,287,250 | A | 9/1981 | Rudy |
| 4,336,533 | A | 6/1982 | Wettach |
| 4,360,071 | A | 11/1982 | Dyck |
| 4,381,829 | A | 5/1983 | Montaron |
| 4,383,584 | A | 5/1983 | Dyck |
| 4,456,084 | A | 6/1984 | Miller |
| 4,476,461 | A | 10/1984 | Carubia |
| 4,483,030 | A | 11/1984 | Flick et al. |
| 4,491,841 | A | 1/1985 | Clark |
| 4,524,757 | A | 6/1985 | Buckley |
| 4,525,886 | A | 7/1985 | Savenije |
| 4,534,078 | A | 8/1985 | Viesturs et al. |
| 4,549,436 | A | 10/1985 | Barkhoudarian |
| 4,589,695 | A | 5/1986 | Isono |
| 4,592,588 | A | 6/1986 | Isono et al. |
| 4,625,320 | A | 11/1986 | Butcher |
| 4,625,329 | A | 11/1986 | Ishikawa et al. |
| 4,639,872 | A | 1/1987 | McHale et al. |
| 4,644,597 | A * | 2/1987 | Walker ................................ 5/711 |
| 4,645,233 | A | 2/1987 | Bruse et al. |
| 4,655,505 | A | 4/1987 | Kashiwamura et al. |
| 4,686,722 | A | 8/1987 | Swart |
| 4,697,656 | A | 10/1987 | de Canecaude |
| 4,698,571 | A | 10/1987 | Mizuta et al. |
| 4,706,498 | A | 11/1987 | Nemnich et al. |
| 4,722,550 | A | 2/1988 | Imaoka et al. |
| 4,724,293 | A | 2/1988 | Bertels |
| 4,738,486 | A | 4/1988 | Surber |
| 4,775,185 | A * | 10/1988 | Scholin et al. ............ 297/284.11 |
| 4,796,013 | A | 1/1989 | Yasuda et al. |
| 4,811,226 | A | 3/1989 | Shinohara |
| 4,823,417 | A | 4/1989 | Fukuichi |
| 4,833,614 | A | 5/1989 | Saitoh et al. |
| 4,844,072 | A | 7/1989 | French et al. |
| 4,851,705 | A | 7/1989 | Musser et al. |
| 4,852,195 | A | 8/1989 | Schulman |
| 4,885,566 | A | 12/1989 | Aoki et al. |
| 4,885,827 | A * | 12/1989 | Williams ........................ 29/91.1 |
| 4,907,153 | A | 3/1990 | Brodsky |
| 4,908,895 | A | 3/1990 | Walker |
| D309,605 | S | 7/1990 | Fortune et al. |
| D310,665 | S | 9/1990 | Fortune et al. |
| 4,955,435 | A | 9/1990 | Shuster et al. |
| 4,957,286 | A * | 9/1990 | Persons et al. .................. 482/57 |
| 4,980,573 | A | 12/1990 | White et al. |
| 4,985,835 | A | 1/1991 | Sterler et al. |
| 4,987,898 | A | 1/1991 | Sones |
| 4,997,053 | A | 3/1991 | Drori et al. |
| 5,007,111 | A | 4/1991 | Adams |
| 5,008,946 | A | 4/1991 | Ando |
| 5,010,774 | A | 4/1991 | Kikuo et al. |
| 5,022,110 | A | 6/1991 | Stroh |
| 5,041,976 | A | 8/1991 | Marko et al. |
| 5,052,068 | A | 10/1991 | Graebe |
| 5,071,160 | A | 12/1991 | White et al. |
| 5,072,966 | A | 12/1991 | Nishitake et al. |
| 5,074,583 | A | 12/1991 | Fujita et al. |
| 5,076,643 | A | 12/1991 | Colasanti et al. |
| 5,082,326 | A | 1/1992 | Sekido et al. |
| 5,107,557 | A | 4/1992 | Boyd |
| 5,117,373 | A | 5/1992 | Huff |
| 5,118,134 | A | 6/1992 | Mattes et al. |
| 5,125,238 | A | 6/1992 | Ragan et al. |
| 5,125,686 | A | 6/1992 | Yano et al. |
| 5,155,685 | A | 10/1992 | Kishi et al. |
| 5,161,820 | A | 11/1992 | Vollmer |
| 5,164,709 | A | 11/1992 | Lamberty et al. |
| 5,164,901 | A | 11/1992 | Blackburn et al. |
| 5,176,424 | A | 1/1993 | Tobita et al. |
| 5,184,112 | A | 2/1993 | Gusakov |
| 5,202,831 | A | 4/1993 | Blackburn et al. |
| 5,209,510 | A | 5/1993 | Mamiya |
| 5,232,243 | A | 8/1993 | Blackburn et al. |
| 5,254,924 | A | 10/1993 | Ogasawara |
| 5,275,315 | A | 1/1994 | Carmack et al. |
| 5,301,772 | A | 4/1994 | Honda |
| 5,320,409 | A | 6/1994 | Katoh et al. |
| 5,322,323 | A | 6/1994 | Ohno et al. |
| 5,324,071 | A | 6/1994 | Gotomyo et al. |
| 5,330,226 | A | 7/1994 | Gentry et al. |
| 5,343,411 | A | 8/1994 | Olsson |
| 5,343,579 | A | 9/1994 | Dickerhoff et al. |
| 5,366,241 | A | 11/1994 | Kithil |
| 5,377,108 | A | 12/1994 | Nishio |
| 5,383,919 | A | 1/1995 | Kelly et al. |
| 5,390,951 | A | 2/1995 | Iyoda |
| 5,398,185 | A | 3/1995 | Omura |
| 5,400,018 | A | 3/1995 | Scholl et al. |
| 5,404,128 | A | 4/1995 | Ogino et al. |
| 5,408,411 | A | 4/1995 | Nakamura et al. |
| 5,411,289 | A | 5/1995 | Smith et al. |
| 5,413,378 | A | 5/1995 | Steffens, Jr. et al. |
| 5,427,331 | A | 6/1995 | Stroud |
| 5,430,275 | A | 7/1995 | Braunisch |
| 5,439,249 | A | 8/1995 | Steffens, Jr. et al. |
| 5,446,391 | A | 8/1995 | Aoki et al. |
| 5,446,661 | A | 8/1995 | Gioutsos et al. |
| 5,449,379 | A | 9/1995 | Hadtke |
| 5,454,591 | A | 10/1995 | Mazur et al. |
| 5,458,516 | A | 10/1995 | Uglene et al. |
| 5,466,001 | A | 11/1995 | Gotomyo et al. |
| 5,466,202 | A | 11/1995 | Stern |
| 5,467,022 | A | 11/1995 | Aoki et al. |
| 5,474,327 | A | 12/1995 | Schousek |
| 5,481,906 | A | 1/1996 | Nagayoshi et al. |
| 5,482,314 | A | 1/1996 | Corrado et al. |
| 5,483,447 | A | 1/1996 | Jeenicke et al. |
| 5,490,069 | A | 2/1996 | Gioutsos et al. |
| 5,494,311 | A | 2/1996 | Blackburn |
| 5,513,109 | A | 4/1996 | Fujishima |
| 5,518,802 | A | 5/1996 | Colvin et al. |
| 5,524,961 | A | 6/1996 | Howard |
| 5,531,472 | A | 7/1996 | Semchena et al. |
| 5,558,395 | A | 9/1996 | Huang |
| 5,561,875 | A | 10/1996 | Graebe |
| 5,566,978 | A | 10/1996 | Fleming et al. |
| 5,573,269 | A | 11/1996 | Gentry et al. |
| 5,583,771 | A | 12/1996 | Lynch et al. |
| 5,596,781 | A | 1/1997 | Graebe |
| 5,609,358 | A | 3/1997 | Iyoda et al. |
| 5,615,917 | A | 4/1997 | Bauer |
| 5,640,727 | A | 6/1997 | Kappel |

| | | | |
|---|---|---|---|
| 5,647,078 A | 7/1997 | Pekar | |
| 5,653,462 A | 8/1997 | Breed et al. | |
| 5,658,050 A | 8/1997 | Lorbiecki | |
| 5,670,853 A | 9/1997 | Bauer | |
| 5,684,460 A | 11/1997 | Scanlon | |
| 5,691,693 A | 11/1997 | Kithil | |
| 5,694,320 A | 12/1997 | Breed | |
| 5,702,123 A | 12/1997 | Takahashi et al. | |
| 5,709,404 A | 1/1998 | Brooks | |
| 5,711,760 A | 1/1998 | Ibrahim et al. | |
| 5,732,375 A | 3/1998 | Cashler | |
| 5,748,473 A | 5/1998 | Breed et al. | |
| 5,758,924 A | 6/1998 | Vishey | |
| 5,767,766 A | 6/1998 | Kwun | |
| 5,782,485 A | 7/1998 | Takeda et al. | |
| 5,785,347 A | 7/1998 | Adolph et al. | |
| 5,797,155 A | 8/1998 | Maier et al. | |
| 5,806,927 A | 9/1998 | Schneider | |
| 5,822,707 A | 10/1998 | Breed et al. | |
| 5,832,630 A | 11/1998 | Potter | |
| 5,868,466 A * | 2/1999 | Massara et al. | 297/284.6 |
| 5,877,677 A | 3/1999 | Fleming et al. | |
| D409,935 S | 5/1999 | Speckhart | |
| 5,904,219 A | 5/1999 | Anahid et al. | |
| 5,905,210 A | 5/1999 | O'Boyle et al. | |
| 5,915,281 A | 6/1999 | Sparks | |
| 5,918,696 A * | 7/1999 | VanVoorhies | 180/273 |
| 5,927,427 A | 7/1999 | Sewell et al. | |
| 5,932,809 A | 8/1999 | Sparks et al. | |
| 5,942,695 A | 8/1999 | Verma et al. | |
| 5,957,491 A | 9/1999 | Cech et al. | |
| 5,959,214 A | 9/1999 | Vaidyanthan et al. | |
| 5,975,568 A * | 11/1999 | Speckhart et al. | 280/735 |
| 5,975,629 A | 11/1999 | Lorbiecki | |
| 5,979,585 A | 11/1999 | Van Voorhies | |
| 5,984,349 A | 11/1999 | Van Voorhies | |
| 5,987,370 A | 11/1999 | Murphy et al. | |
| 5,987,371 A | 11/1999 | Bailey et al. | |
| 5,987,705 A | 11/1999 | Reynolds | |
| 6,012,007 A | 1/2000 | Fortune et al. | |
| 6,021,863 A | 2/2000 | Stanley | |
| 6,041,658 A | 3/2000 | Casey | |
| 6,043,566 A | 3/2000 | Bryant et al. | |
| 6,055,473 A | 4/2000 | Zwolinski et al. | |
| 6,056,079 A * | 5/2000 | Cech et al. | 180/273 |
| 6,056,360 A | 5/2000 | Schneider | |
| 6,058,341 A | 5/2000 | Myers et al. | |
| 6,088,639 A | 7/2000 | Fayyad et al. | |
| 6,088,642 A | 7/2000 | Finkelstein et al. | |
| 6,088,643 A | 7/2000 | Long et al. | |
| 6,098,000 A | 8/2000 | Long et al. | |
| 6,101,436 A * | 8/2000 | Fortune et al. | 701/45 |
| 6,113,141 A | 9/2000 | Baker | |
| 6,138,067 A | 10/2000 | Cobb et al. | |
| 6,161,439 A | 12/2000 | Stanley | |
| 6,203,105 B1 | 3/2001 | Rhodes, Jr. | |
| 6,246,936 B1 | 6/2001 | Murphy et al. | |
| 6,252,240 B1 | 6/2001 | Gillis et al. | |
| 6,253,134 B1 | 6/2001 | Breed et al. | |
| 6,260,879 B1 | 7/2001 | Stanley | |
| 6,286,861 B1 * | 9/2001 | Cech et al. | 280/735 |
| 6,345,839 B1 | 2/2002 | Kuboki et al. | |
| 6,360,618 B2 * | 3/2002 | Anahid et al. | 73/862.627 |
| 6,392,166 B1 | 5/2002 | Fortune et al. | |
| 6,431,591 B1 * | 8/2002 | Ray et al. | 280/735 |
| 6,438,476 B1 | 8/2002 | Gray et al. | |
| 6,438,477 B1 | 8/2002 | Patterson et al. | |
| 6,468,237 B1 | 10/2002 | Lina | |
| 6,479,766 B2 | 11/2002 | Gray et al. | |
| 6,490,936 B1 * | 12/2002 | Fortune et al. | 73/862.581 |
| 6,539,771 B1 | 4/2003 | Davidson et al. | |
| 6,542,802 B2 | 4/2003 | Gray et al. | |
| 6,578,871 B2 | 6/2003 | Gray et al. | |
| 6,587,770 B1 | 7/2003 | Gray et al. | |
| 6,605,877 B1 | 8/2003 | Patterson et al. | |
| 6,650,978 B1 | 11/2003 | Patterson et al. | |
| 6,662,094 B2 | 12/2003 | Murphy et al. | |
| 6,674,024 B2 * | 1/2004 | Cech et al. | 177/144 |
| 6,679,524 B2 | 1/2004 | Greib et al. | |

| | | | |
|---|---|---|---|
| 6,683,534 B2 | 1/2004 | Patterson et al. | |
| 6,818,842 B2 | 11/2004 | Gray et al. | |
| 6,850,825 B2 | 2/2005 | Murphy et al. | |
| 6,886,417 B2 * | 5/2005 | Murphy et al. | 73/862.581 |
| 6,889,146 B2 | 5/2005 | Sullivan et al. | |
| 6,912,920 B2 | 7/2005 | Fortune et al. | |
| 6,927,678 B2 * | 8/2005 | Fultz et al. | 340/438 |
| 6,957,829 B2 | 10/2005 | Rogers, Jr. et al. | |
| 6,966,233 B2 * | 11/2005 | Brown | 73/862.581 |
| 6,987,229 B2 | 1/2006 | Murphy | |
| 6,997,278 B2 | 2/2006 | Fortune | |
| 6,997,478 B2 | 2/2006 | Hlavaty et al. | |
| 6,999,301 B1 | 2/2006 | Sanftleben et al. | |
| 7,000,948 B2 * | 2/2006 | Little et al. | 280/743.1 |
| 7,024,294 B2 | 4/2006 | Sullivan et al. | |
| 7,039,514 B2 | 5/2006 | Fortune | |
| 7,047,827 B1 | 5/2006 | Mithal | |
| 7,059,446 B2 | 6/2006 | Murphy et al. | |
| 7,106,206 B2 | 9/2006 | Sprecher et al. | |
| 7,119,705 B2 | 10/2006 | Manlove et al. | |
| 7,120,527 B2 | 10/2006 | Prieto et al. | |
| 7,120,554 B2 | 10/2006 | Gray et al. | |
| 7,133,752 B2 | 11/2006 | Gray et al. | |
| 7,143,658 B2 | 12/2006 | Schubert | |
| 7,146,721 B2 | 12/2006 | Hunkeler et al. | |
| 7,159,471 B2 | 1/2007 | Fortune et al. | |
| 7,188,536 B2 * | 3/2007 | Waidner et al. | 73/862.454 |
| 7,188,898 B2 | 3/2007 | Patterson et al. | |
| 7,190,277 B2 | 3/2007 | Fultz et al. | |
| 7,217,891 B2 * | 5/2007 | Fischer et al. | 177/144 |
| 7,224,270 B2 | 5/2007 | Patterson et al. | |
| 7,233,852 B2 | 6/2007 | Murphy et al. | |
| 7,237,443 B2 * | 7/2007 | Speckhart et al. | 73/862.046 |
| 7,325,870 B2 | 2/2008 | Lawrence et al. | |
| 7,347,452 B2 | 3/2008 | Maloney et al. | |
| 7,385,520 B2 | 6/2008 | Patterson et al. | |
| 7,403,845 B2 | 7/2008 | Patterson et al. | |
| 7,408,123 B2 | 8/2008 | Hawes et al. | |
| 7,410,214 B2 | 8/2008 | Hayden et al. | |
| 7,422,283 B2 | 9/2008 | Patterson et al. | |
| 7,434,482 B1 | 10/2008 | Van Steenwyk et al. | |
| 7,478,875 B2 | 1/2009 | Patterson et al. | |
| 2006/0066085 A1 * | 3/2006 | DuRocher | 280/735 |

FOREIGN PATENT DOCUMENTS

| | | |
|---|---|---|
| DE | 3802159 | 8/1989 |
| DE | 4023109 | 1/1992 |
| EP | 0152092 | 8/1985 |
| EP | 0345806 A2 | 12/1989 |
| EP | 0728636 | 8/1996 |
| EP | 0721863 B1 | 10/2000 |
| EP | 1413863 | 4/2004 |
| EP | 1502546 A1 | 2/2005 |
| EP | 1491387 B1 | 8/2006 |
| EP | 1533194 B1 | 5/2007 |
| EP | 1529680 B1 | 11/2007 |
| EP | 1733928 A3 | 9/2008 |
| EP | 2072324 A2 | 6/2009 |
| GB | 2289332 | 11/1995 |
| JP | 56147530 A | 11/1981 |
| JP | 6233714 | 8/1984 |
| JP | 59230833 | 12/1984 |
| JP | 60022497 A | 2/1985 |
| JP | 61291233 | 12/1986 |
| JP | 1229741 A | 9/1989 |
| JP | 02-296584 | 7/1990 |
| JP | 2286448 A | 11/1990 |
| JP | 3062699 A | 3/1991 |
| JP | 446843 A | 2/1992 |
| JP | HEI 4-138996 | 5/1992 |
| JP | 4166109 A | 6/1992 |
| JP | 5032171 U | 4/1993 |
| JP | 6286508 | 10/1994 |
| JP | 8070961 | 3/1996 |
| NL | 8200401 | 9/1983 |
| WO | WO9113784 | 9/1991 |
| WO | WO9422693 | 10/1994 |
| WO | WO9423973 | 10/1994 |
| WO | WO9830411 | 7/1998 |

| WO | WO9831992 | | 7/1998 |
| WO | WO0013945 | A1 | 3/2000 |
| WO | WO0079217 | A2 | 12/2000 |
| WO | WO2005016684 | A3 | 2/2005 |

OTHER PUBLICATIONS

49 CFR Part 571, Part IV, Federal Motor Vehicle Safety Standards; Occupant Crash Protection; Final Rule, Department of Transportation, National Highway Traffic Safety Administration, Dec. 18, 2001, pp. 65377-65421.
434121 Vehicle Occupant Classification using Weight Sensors and Electrostatic Field Sensing, Research Disclosure, Jun. 2000, 1106.
441055 Calibration of Occupant Weight Sensing Systems, Research Disclosure, p. 63, Jan. 2001.
411106 Weight Determination, p. 113, Jan. 2001.
459002, Hydraulic Offset Compensation, Research Disclosure, Jul. 2002, p. 1153.
459023, Bladder Filling Method using Initial Filled Pressure, Research Disclosure, Jul. 2002, p. 1176,.
459038, Six Year Old Safe Seat Offloading Compensation.
485075, Elimination of Enclosure Fill Orifice, Research Disclosure, Sep. 2004, p. 1232.
485082, Fluids for a Fluid Filled Passenger Occupancy Detection System, Sep. 2004, p. 123.
187037, Onsert Molded Occupant Sensing Device, Research Disclosure, Nov. 2004, p. 1441.
42340, Method and Apparatus for Classifying Seat Occupancy with Seat Belt Tension Input, Research Disclosure, Jul. 1999, p. 936.
41520, Fluid Load Cell Weight Classification Systems, Research Disclosure, Nov. 1998, p. 1452.
Delphi Automotive Systems, LLC's Delphi Technologies, Inc's, DPH-DAS LL's, and Marian Inc.'s Preliminary Invalidity Contentions, Apr. 5, 2010 *Methode Electronics, INc., V. DPH-DAS LLC f/k/a Delphi Automotive Systems, LLC, et al.* 09-cv 13078 (D. Mich.).
Methode Electronic's Inc's Supplemental Response to DPH-DAS's Interrogatory No. 3, Apr. 21, 2010, *Methode Electronics Inc. V. DPH-DAS LLC f/k/a Delphi Automotive Systems LLC, et al.* 09-cu-13078 (D Mich.).
Opening Claim Construction Brief of Delphi Automotive Systems, LLC, DPH-DAS LLC, Marian, Inc., and Delphi Technologies, Inc., and Exhibits 1-6; Jun. 1, 2010; *Methode Electronics, Inc. vs. DPH-DAS LLC f/k/a Delphi Automotive Systems LLC, et al.*; 09-CV-13078 (D-Mich.).
Opening Claim Construction Brief of Delphi Automotive Systems, LLC, DPH-DAS LLC, Marian, Inc., and Delphi Technologies, Inc., and Exhibits 7-11; Jun. 21, 2010, DPH-DAS LLC f/k/a Delphi Automotive Systems LLC et al.; 09-CV-13078 (D. Mich).
Plaintiff Methode Electronics Inc.'s Opening Claim Construction Brief and Exhibits A thru M; Jun. 1, 2010; *Methode Electronics Inc. v. DPH-DAS LLC f/k/a Delphi Automotive Systems LLC, et al.* 09-cv-13078 (D. Mich).
Plaintiff Methode Electronics, Inc.'s Opposition Claim Construction Brief and Exhibits A, B and C; Jun. 21, 2010; *Methode Electronics Inc. v. DPH-DAS LLC f/k/a Delphi Automotive Systems LLC, et al.*; 09-cv-13078 (D. Mich).
Delphi Automotive Systems, LLC's, Delphi Technologies, Inc's, DPH-DAS LLC's and Marian, Inc's First Amended Preliminary Invalidity Contentions, Jan. 17, 2011, *Method Electronics, Inc. v. DPH-DAS LLC f/k/a Delphi Automotive Systems, LLC et al.* 09-cv-13078 (D Mich).
Delphi Automotive Systems, LLC's, Delphi Technolgies, Inc's, DPH-DAS LLC's and Marian, Inc.'s Second Amended Preliminary Invalidity Contentions, Jun. 15, 2011, *Methode Electronics, Inc. v. DPH-DAS LLC f/k/a Delphi Automotive Systems, LLC et al.*, 09-cv-13078 (D. Mich) *Delphi Automotive Systems, LLC v. Methode Electronics, Inc.*, 09-cv-14303 (D. Mich).

* cited by examiner

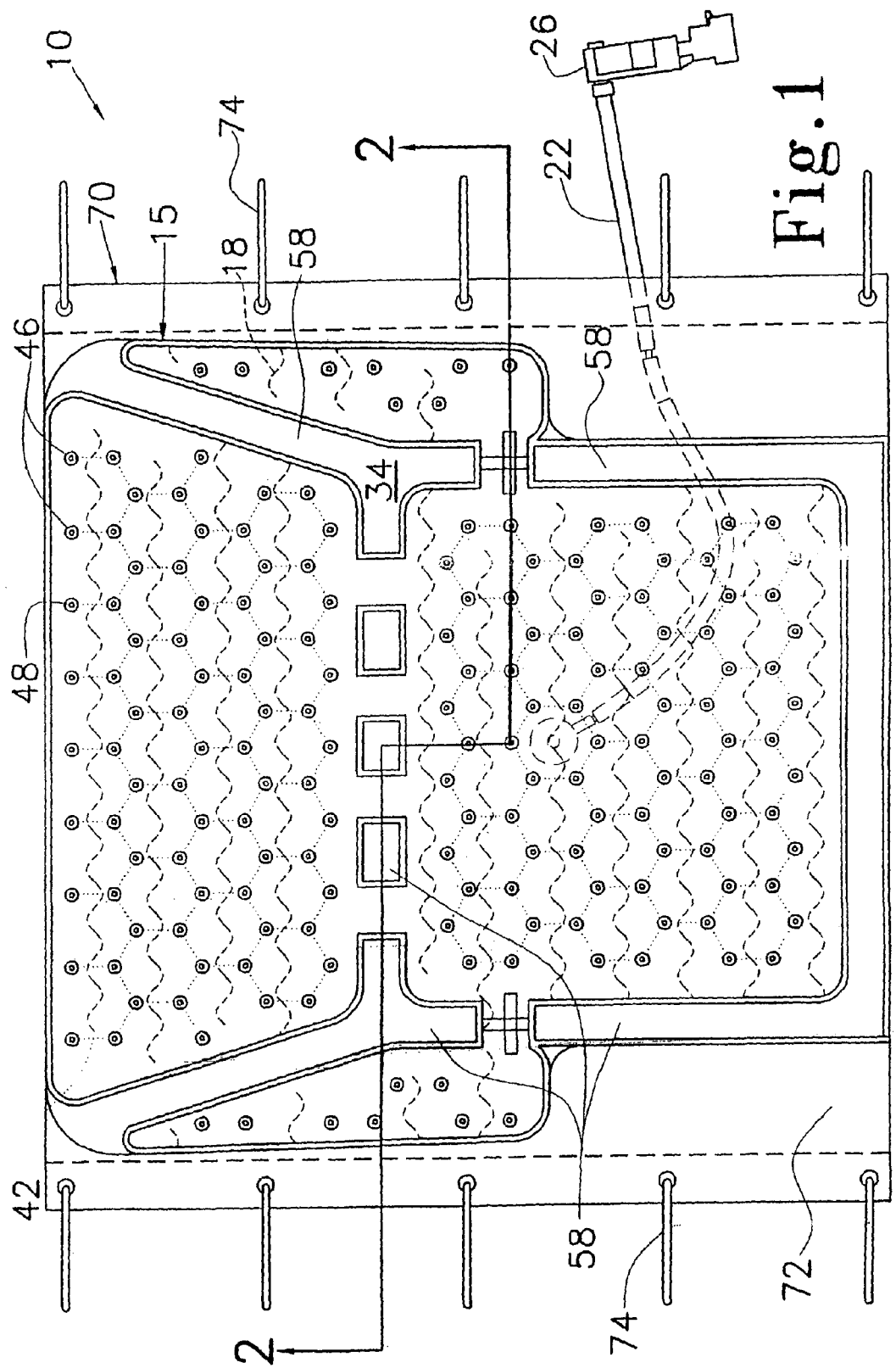

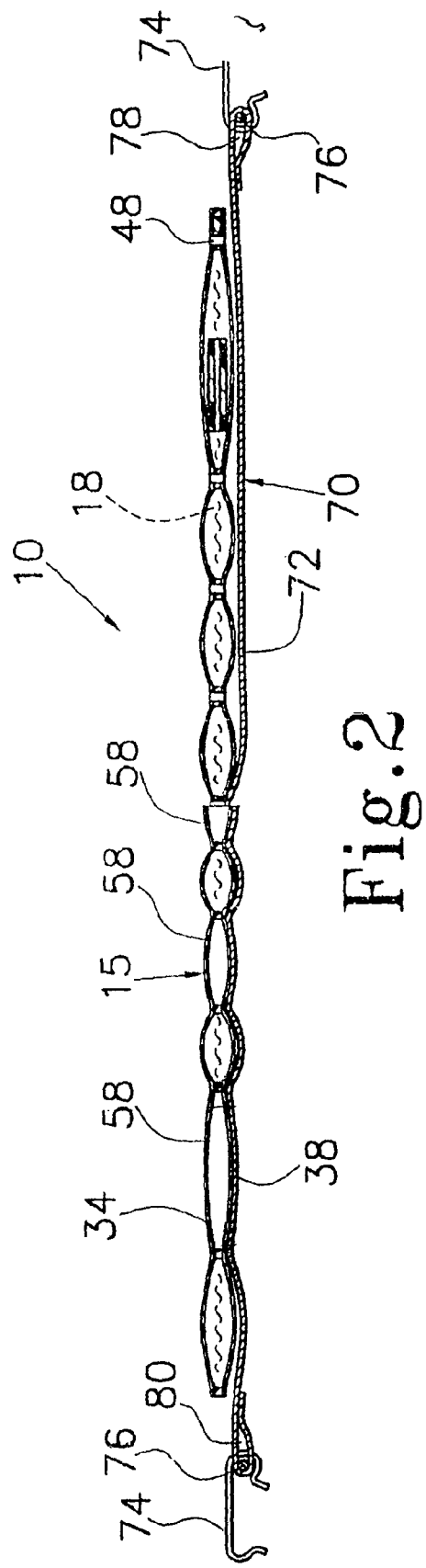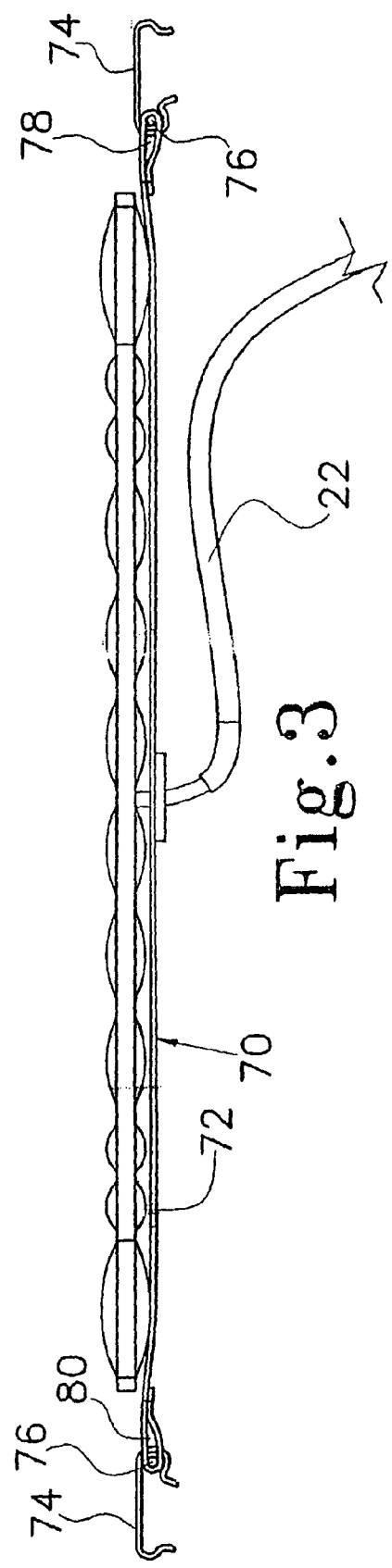

SENSOR PAD FOR CONTROLLING AIRBAG DEPLOYMENT AND ASSOCIATED SUPPORT

This application is a continuation of Ser. No. 11/362,745, filed Feb. 28, 2006 now U.S. Pat. No. 7,237,443; which is a continuation of Ser. No. 11/110,718, filed Apr. 21, 2005 now abandoned; which was a continuation of Ser. No. 10/677,360, filed Oct. 3, 2003 (now abandoned); which was a continuation of Ser. No. 09/988,206, filed Nov. 19, 2001 (abandoned), which was a continuation of Ser. No. 09/368,113, filed Aug. 4, 1999 (abandoned); which was a continuation-in-part of Ser. No. 09/146,677, filed Sep. 3, 1998 (U.S. Pat. No. 5,975,568), which in turn was a continuation-in-part of Ser. No. 09/072,833, filed May 5, 1998 now abandoned and Ser. No. 29/085,897, filed Apr. 1, 1998 (U.S. Pat. No. Des. 409,935).

TECHNICAL FIELD

This invention relates to the field of weight sensing pads. More particularly, it relates to a sensor pad, and associated sensor pad support, for detecting both the presence and weight of a passenger for controlling deployment of an automobile airbag.

BACKGROUND ART

In recent years, airbags or self-inflating restraints, have proven to be effective in preventing injury resulting from head-on and near head-on collisions, when used correctly in conjunction with the shoulder-lap restraints. However, a small number of highly publicized incidents have highlighted a serious risk of potentially catastrophic injury to small adults, children or infants in rear-facing child-safety seats. While it is certainly advisable to place small children or infants in rear-facing child-safety seats in a rear seat, in certain types of vehicles, namely pick-up trucks, this is simply not an option. As a result, a demand has arisen for selective deployment of the automobile's self-inflating restraint. In response, certain automobile manufacturers now provide a key-switch to allow the owner/operator to choose whether or not the self-inflating restraint should be "armed" that is to say, whether the self-inflating restraint should be active and deployable in the event of a collision. However, these types of manual controls, or overrides, also carry an inherent risk. Namely the inadvertent failure to re-arm the restraint for an adult passenger, or the failure to deactivate the restraint in the event that the passenger seat is occupied by a child or safety seat. Further, the state of the art airbag deployment system does not detect whether the passenger seat is unoccupied and in the event of a collision fires the airbag, needlessly resulting in the unnecessary expense of replacing the dash and airbag mechanism.

What is missing in the art is a sensor pad that would detect the presence or absence of a person sitting in the seat and that could distinguish between an average size adult and a diminutive adult or child safety seat so as to control the deployment of an automobile self-inflating restraint, such as an airbag.

Accordingly, it is an object of the present invention to provide a sensor pad for controlling the deployment of a self-inflating restraint.

Another object of the present invention is to provide a sensor pad that is weight sensitive and that detects the presence of a person sitting in seat associated with the sensor pad and that upon detection of a person occupying the seat directs the airbag to deploy in the event of a collision.

Yet another object of the present invention is to provide a sensor pad for controlling the deployment of an automobile airbag without significantly increasing the vehicle weight or cost of manufacture.

Other objects and advantages over the prior art will become apparent to those skilled in the art upon reading the detailed description together with the drawings as described as follows.

DISCLOSURE OF THE INVENTION

In accordance with the various features of this invention, a sensor pad for controlling the deployment of an automobile airbag is provided. In the preferred embodiment, the weight sensing pad is used in the seat of an automobile to sense the detect the presence of the seat's occupant. The volumetric displacement of the fluid within the weight sensing pad produces a pressure change and is measured with an electronic pressure transducer and is used to determine if an airbag should be deployed upon impact in a collision. In this regard, the transducer is in electronic communication with the vehicle's airbag control module. The weight sensing pad is defined by a thin, fluid-filled bladder. The bladder is preferably constructed of two identical sheets of urethane. The urethane sheets are spot welded together at a plurality of points or areas in order to form cells, in a selected geometric configuration, in fluid communication with one another. The size, geometric configuration and cross-sectional area of the spots are selected so as to maximize performance while minimizing weight. In this regard, in order to minimize the weight of the bladder, internal volume must be small in relation to the external surface area of the weight sensing pad. The bladder in the preferred embodiment is filled with a non-compressible fluid having a very low freezing point, such that there are a minimum of air, or gas, pockets within the bladder. A silicone, such as silica gel, of medium viscosity is a suitable fluid.

Volumetric displacement, under pressure, of the fluid within the bladder is dependent on a number of factors such as bladder stiffness, i.e. the ability of the urethane material to resist stretching, the zero pressure volume of the bladder, the seated area of the passenger or child safety seat, and the weight of the seated passenger or car safety seat. Bladder stiffness can be measured in units of $lb/in^5$ and can be defined to be the slope of the curve of volume change vs. pressure increase. In other words bladder stiffness=pressure change/volume change=$lb/in^2/in^3$. Bladder stiffness is a function of the physical size and shape of the individual cells as well as the thickness of the bladder material. The preferred bladder will have a high bladder stiffness. The slope of the curve is not expected to be constant. As the bladder volume increases, the slope of the curve is expected to increase.

Zero pressure volume is defined as the volume of fluid that will first cause the pressure in the bladder to increase. In order to have minimum bladder weight, the zero pressure volume should be as small as possible. Thus, the preferred bladder has a relatively small zero pressure volume and a high degree of bladder stiffness. A bladder having a large number of relatively small internal cells in fluid communication with one another and a thin-wall bladder material meets these two criteria.

In one embodiment, the bladder is configured to be placed within the seat portion of a state of the art automobile seat. While, the bladder can be supported by a seat cushion, the bladder is preferably secured to a support member that is suspended on the seat frame. The bladder includes a pressure tube connected to a pressure activated electronic transducer that is in electronic communication with the air bag control module. As will be described in more detail below, the preferred transducer is digital and sends an arming signal to the airbag control module upon detection of a preselected pressure. The bladder further includes a plurality of securement regions for securing the bladder to the seat cushion or the support member. The bladder is formed by two urethane panels that are perimetrically sealed to each other. In the preferred embodiment, the two panels are additionally secured to one another by a plurality of relatively small, preferably circular spot welds configured to form, preferably, hexagonal-like cells that are in fluid communication with each other. Alternatively, the spot welds can be configured to form substantially triangle-like cells, that are in fluid communication with each other or can be placed randomly. In an alternate embodiment, relatively large approximately octagonal spot welds are used to form small fluid cell areas, (about thirty-three percent cell area to about sixty-seven percent weld area), thus reducing the overall weight of the liquid in the bladder.

In use, an electronic transducer is selected to generate a signal upon detection of pressure resultant from the volumetric displacement of fluid inside the bladder expected from the average size adult of approximately one hundred pounds or heavier. In an alternate embodiment, an analog transducer could be utilized to generate a signal as a function of the passenger's weight. With this information the control module would fire the airbag in accordance with a preselected set of conditions. Further information regarding passenger weight could be used to determine the force at which a variable force airbag would deploy as airbag technology advances.

BRIEF DESCRIPTION OF THE DRAWINGS

FIG. 1 illustrates a plan view of the weight sensing pad and support member of the present invention.

FIG. 2 illustrates a cross sectional view of the weight sensing pad and support member of the present invention taken along line 2-2 in FIG. 1.

FIG. 3 illustrates and end view of the embodiment illustrated in FIG. 1.

BEST MODE FOR CARRYING OUT THE INVENTION

Figure 4:
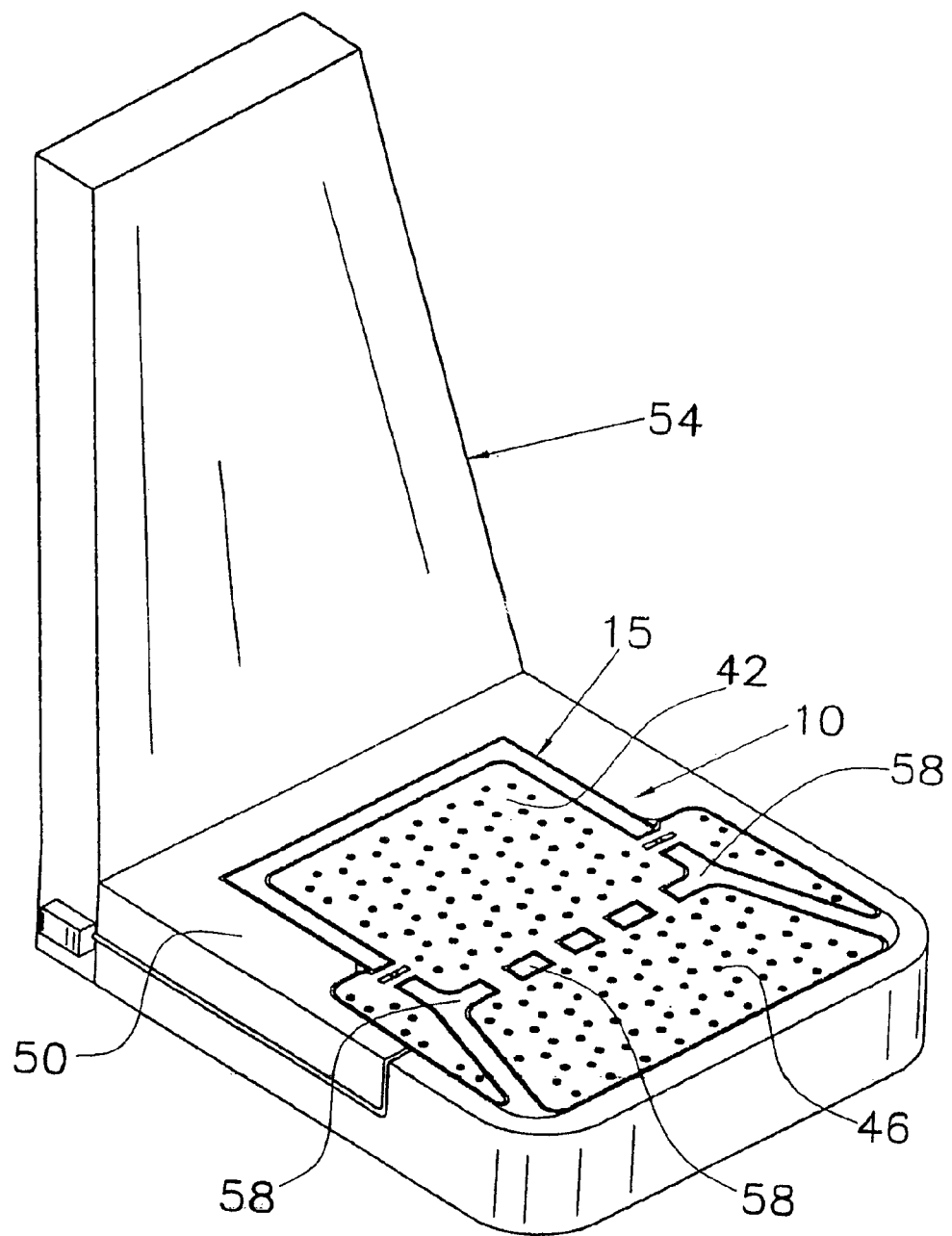
FIG. 4 illustrates a perspective view showing the weight sensing pad positioned above the cushioning in an exemplary automotive seat.
Figure 5:
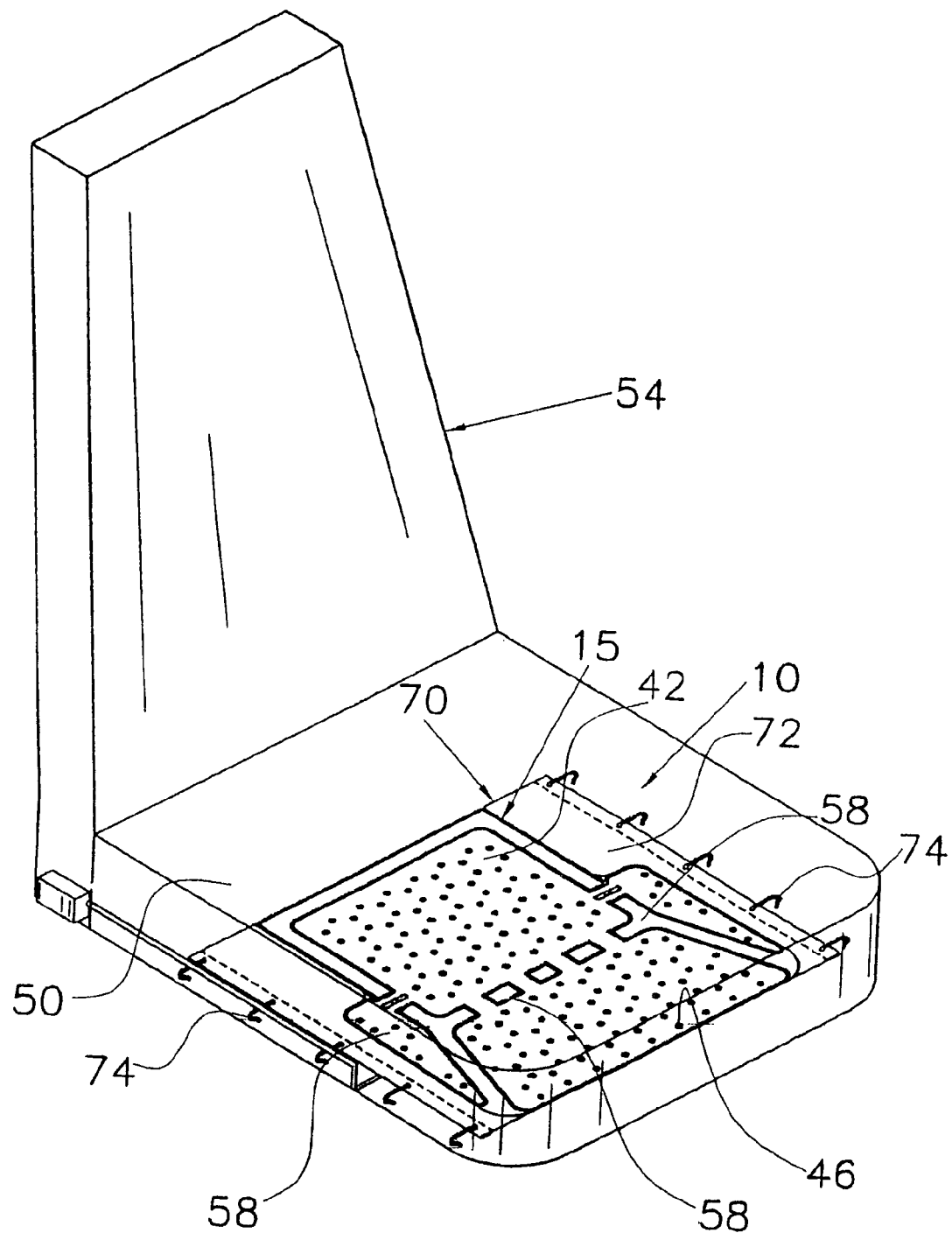
FIG. 5 illustrates a perspective view showing the weight sensing pad positioned below the cushioning in an exemplary automotive seat.
Figure 6:
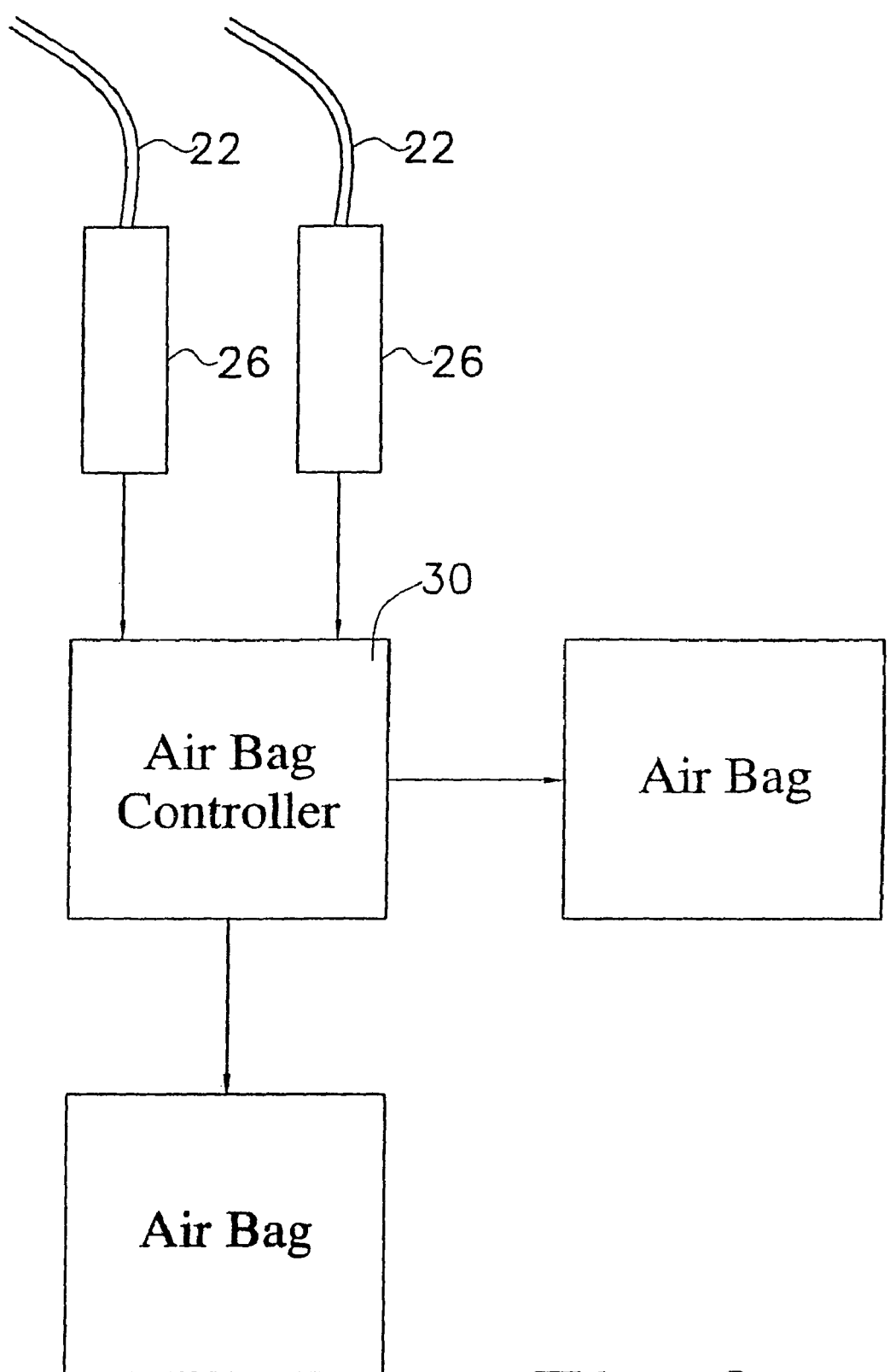
FIG. 6 illustrates a schematic view of the control of air bag deployment by the present weight sensing pad.

A sensor pad for controlling the deployment of an automobile airbag, constructed in accordance with the present invention, is illustrated generally as 10 in the figures. As seen in FIGS. 4 and 5, in the preferred embodiment, weight sensing pad 10 is used in the seat 54 of an automobile, (not illustrated), to detect the presence of an occupant on the seat. Weight sensing pad 10 is used in conjunction with the vehicle's airbag control module in order to allow deployment of the airbag, in the event of a collision, only if the seat is occupied by a person of above a preselected weight. Weight sensing pad 10 is defined by a bladder member 15 having an interior volume subdivided into a plurality of individual cells 42 in fluid communication with each other and that is filled with a non-compressible fluid 18, such as silicone or a silica gel of medium viscosity. In the preferred embodiment, fluid 18 should have a very low freezing point, preferably below the temperature of reasonably anticipated atmospheric conditions to which the typical automobile is exposed. A pressure tube 22 is in fluid communication with bladder 15 and is in further fluid communication with a pressure activated electronic transducer 26 which in turn is in electronic communication with the airbag controller 30. When a person sits upon a seat 54 in which a weight sensing pad 10 is mounted, there is a volumetric displacement of fluid 18 inside the bladder 15 causing the bladder 15 to change shape and consequently causes the pressure to increase which is measured by transducer 26. If there is a sufficient volumetric displacement of fluid to cause sufficient pressure change to activate transducer 26, transducer 26 sends a signal to air bag controller 30. In other words, if a passenger that weighs in excess of a preselected weight is seated on a seat 54 in which a weight sensing pad 10 is mounted, a sufficient volumetric displacement will occur to activate transducer 26.

In the preferred embodiment, bladder 15 is constructed of two preferably substantially identical sheets of urethane 34 and 38. Volumetric displacement, under pressure, of fluid 18 within bladder 15 is dependent on a number of factors such as bladder stiffness, i.e. the ability of the urethane material to resist stretching, the zero pressure volume of bladder 15, the seated area of the passenger and the weight of the seated passenger. Bladder stiffness can be measured in units of $lb/in^5$ and can be defined to be the slope of the curve of volume change vs. pressure increase. In other words, bladder stiffness=pressure change/volume change=$lb/in^2/in^3$. Bladder stiffness is a function of the physical size and shape of the individual cells 42 as well as the thickness of urethane sheets 34 and 38. In general, the bladder stiffness increases when the bladder pressure increases. The preferred bladder 15 will have a high bladder stiffness. The slope of the curve is not expected to be constant. As the bladder volume increases, the slope of the curve is expected to increase.

Zero pressure volume is defined as the volume of fluid 18 that will first cause the pressure in bladder 15 to increase. In order to have minimum bladder weight, the zero pressure volume should be as small as possible. Thus, the preferred bladder 15 has a relatively small zero pressure volume and a high degree of bladder stiffness. A bladder 15 having a large number of relatively small internal cells 42 in fluid communication with one another and thin-wall urethane sheets 34 and 38 meets these two criteria. The urethane sheets 34 and 38 are spot welded together by a plurality of spot welds 46 in order to form cells 42, which are defined by the regions between spot welds 46, in, preferably, a selected geometric configuration, in fluid communication with one another. In the preferred embodiment, a bore hole 48 is provided through each spot weld 46 in order to provide ventilation between the passenger and the seat. The size, geometric configuration and cross-sectional area of cells 42 are selected so as to maximize performance while minimizing weight. In this regard, in order to minimize the weight of the bladder 15, internal volume must be small in relation to the external surface area of the weight sensing pad 10.

The bladder further includes a plurality of securement regions 58 for securing bladder 15 in the seat area 50 either to the seat cushion directly or preferably to support member 70. In this regard, in the preferred embodiment, securement regions 58 are defined by fluid-void regions not in fluid communication with the fluid filled interior volume of bladder 15. Support member 70 is defined by a planar piece of fabric 72 and includes at least one hook member 74 which engages the seat frame (not shown). In this regard, in the preferred embodiment, at least one rigid rod member 76 is disposed in each of two loops 78 and 80 which are in spaced relation from each other. Hooks 74 are carried by rigid rod member 76. A seat cushion overlies sensor pad 10 and is also supported by support member 70.

Figure 7:
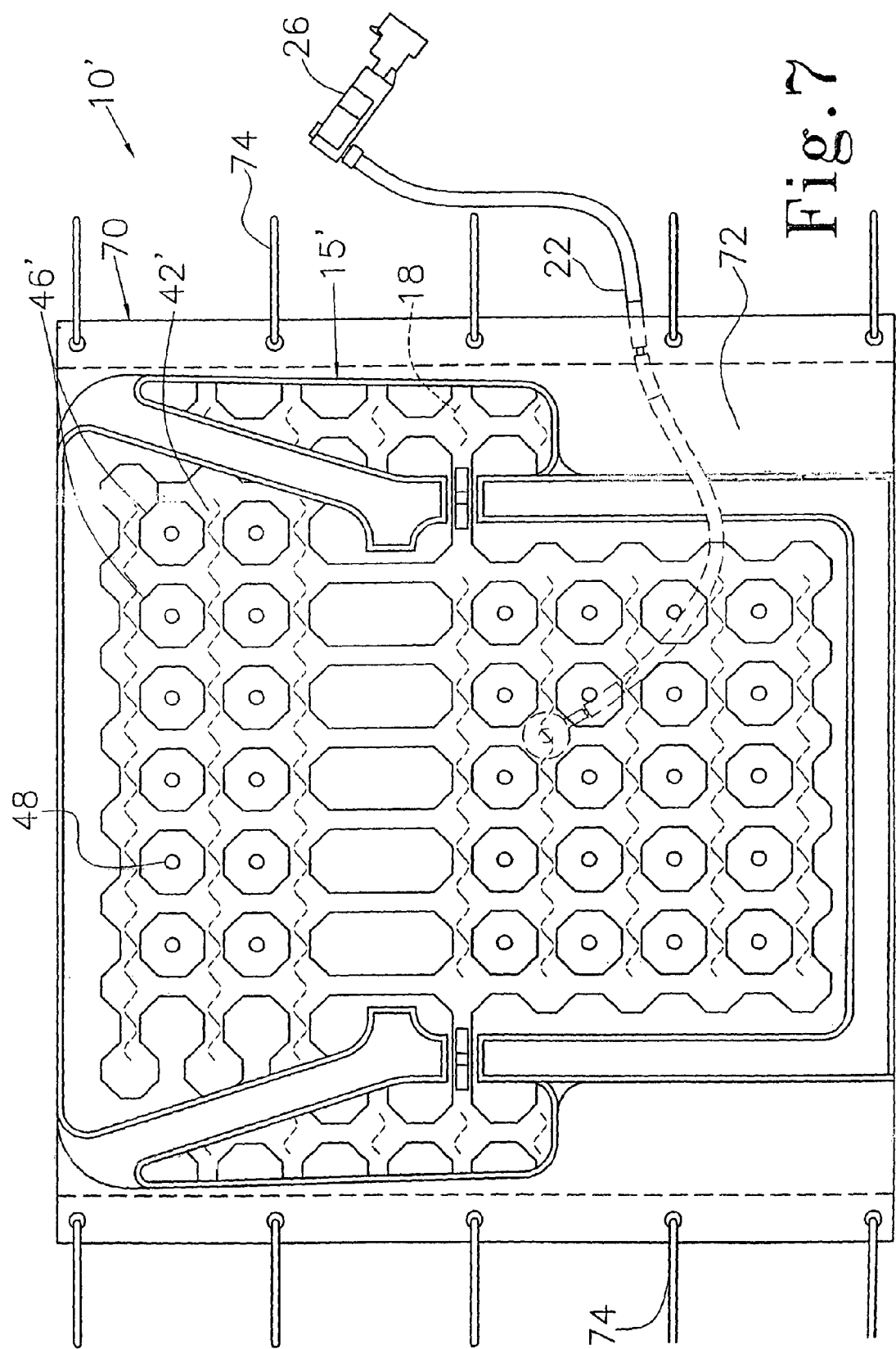
FIG. 7 illustrates an alternate embodiment weight sensing pad.
Figure 8:
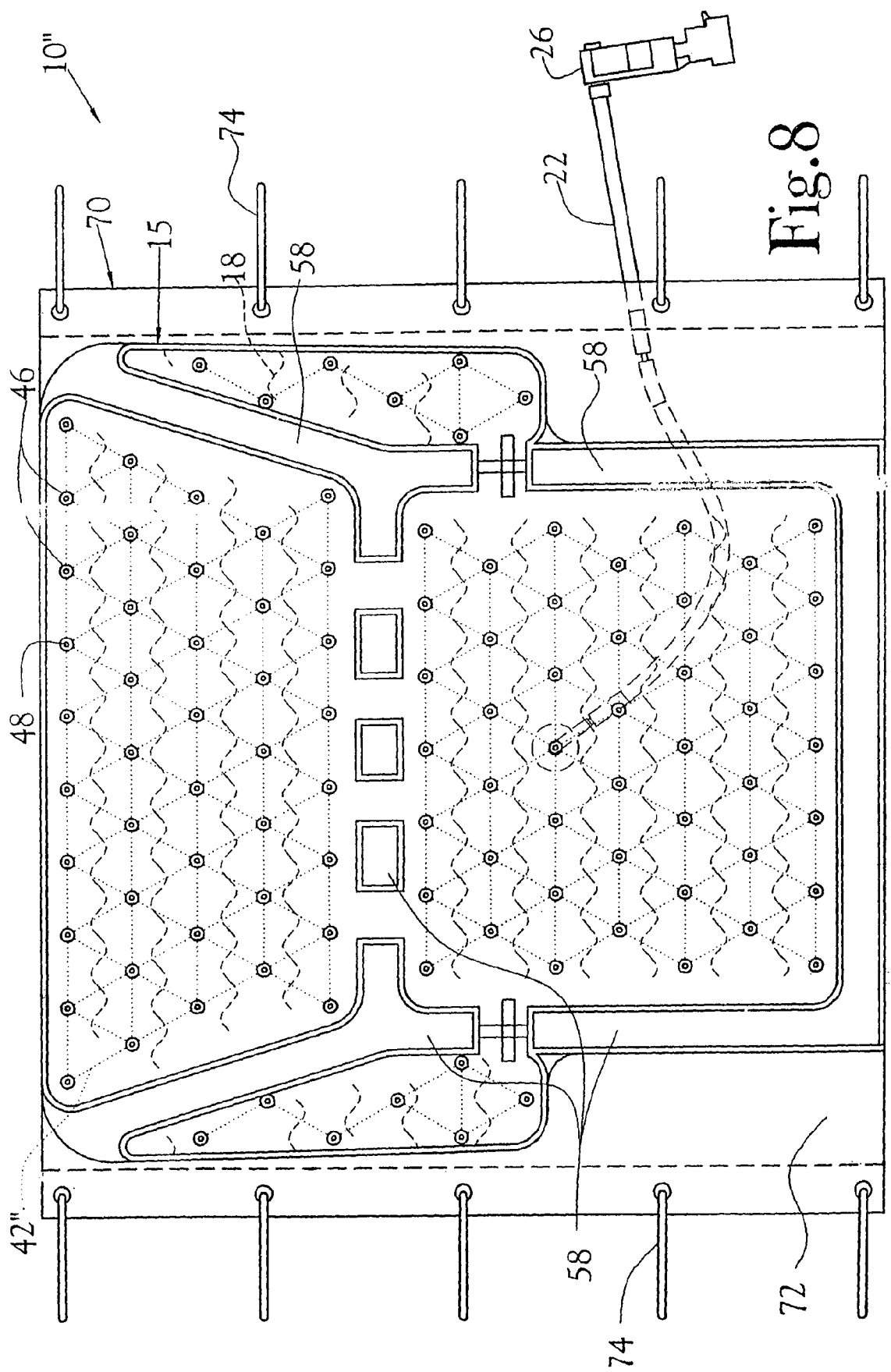
FIG. 8 illustrates a further alternate embodiment weight sensing pad.
Figure 9:
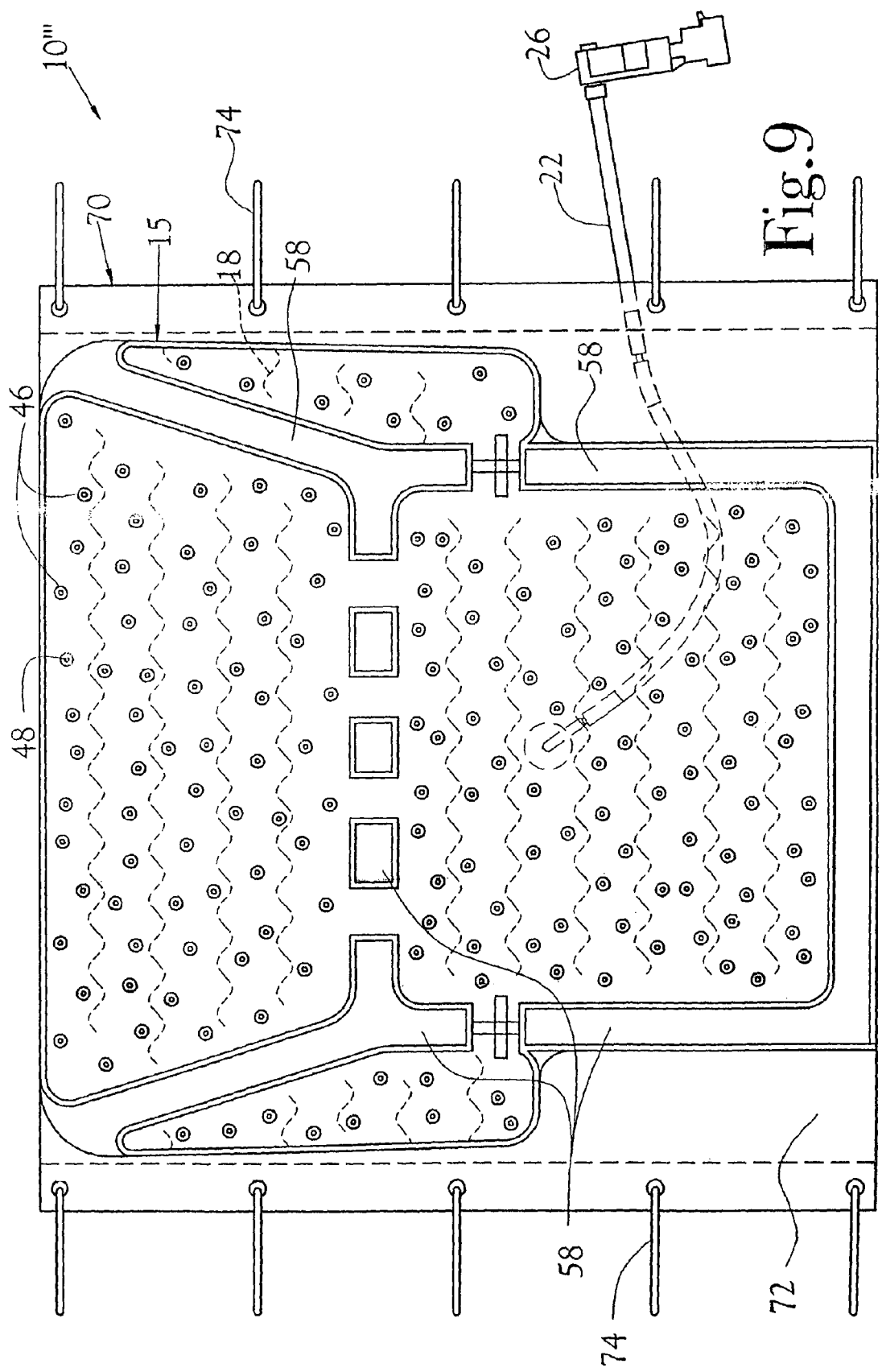
FIG. 9 illustrates still another alternate embodiment weight sensing pad.

In the preferred embodiment, spot welds 46 are relatively small, circular and are selectively positioned so as to form substantially hexagonal cells 42 that are in fluid communication with each other. While hexagonal cells are preferred, other geometrically shaped cells could be utilized. For example, FIG. 8 illustrates cells 42" that are substantially triangular. And, while not as efficient, as the previously described geometrically shaped cells, the spot welds 46 could be randomly placed as illustrated in FIG. 9. In an alternate embodiment, illustrated in FIG. 7, relatively large octagonal spot welds 46' are used to form small fluid cell areas 42', (about thirty-three percent cell area to about sixty-seven percent weld area), thus reducing the overall weight of the bladder 15'. As above, a bore hole 48 is provided through each spot weld 46' in order to provide ventilation between the passenger and the seat.

In use, electronic transducer 26 is selected to generate a signal upon detection of pressure resultant from the volumetric displacement of fluid 18 from bladder 15 expected from the average size adult of approximately one hundred pounds or heavier. Thus, for a small adult or child less than one hundred pounds, or if a chi Id seat is positioned on the seat, there will be insufficient volumetric displacement to cause a pressure change to activate transducer 26 and the airbag controller will not arm the airbag to deploy in the event of a collision. In an alternate embodiment, an analog transducer could be utilized to generate a signal proportional to the passenger's weight. With this information the control module would fire the airbag in accordance with a preselected set of conditions. Further information regarding passenger weight could be used to determine the force at which a variable force airbag would deploy as airbag technology advances.

From the foregoing description, if will be recognized by those skilled in the art that a weight sensing pad for controlling deployment of an automobile airbag offering advantages over the prior art has been provided. Specifically, the sensor pad for controlling the deployment of a self-inflating restraint provides a sensor pad that is weight sensitive and that detects the presence of a person of a selected weight sitting in seat associated with the sensor pad and that upon detection of a person of a selected weight occupying the seat directs the airbag to deploy in the event of a collision without significantly increasing the vehicle weight or cost of manufacture.

While a preferred embodiment has been shown and described, it will be understood that it is not intended to limit the disclosure, but rather it is intended to cover all modifications and alternate methods falling within the spirit and the scope of the invention as defined in the appended claims.

We claim:
1. A weight sensing pad for controlling activation of an automobile airbag, said weight sensing pad comprising:
   a bladder member having an interior volume defined by first and second sheets perimetrically bonded together, wherein said interior volume of said bladder member is subdivided into a plurality of cells in fluid communication with each other by a plurality of small, substantially circular regions of bonding between said first and second sheets; and
   a fluid contained within said interior volume of said bladder member.
2. The weight sensing pad of claim 1 wherein said plurality of cells are uniformly shaped.
3. The weight sensing pad of claim 1 wherein said regions of bonding are defined by spot welds.
4. The weight sensing pad of claim 1 wherein said fluid is non-compressible and has a low freezing point.
5. The weight sensing pad of claim 1 wherein said fluid is silicon.
6. The weight sensing pad of claim 1 wherein said weight sensing pad further comprises a pressure activated electronic transducer in fluid communication with said bladder member and in electronic communication with an airbag control module, wherein said transducer is activated by a selected volumetric displacement of said fluid that provides a pressure change in said bladder member; and a pressure tube interconnected between and in fluid communication with said bladder member and said transducer.
7. The weight sensing pad of claim 1 wherein said weight sensing pad further comprises at least one securement region for facilitating securement of said weight sensing pad to an automobile seat.
8. The weight sensing pad of claim 1 wherein said weight sensing pad further comprises at least one support member for engaging a seat frame, said support member being defined by a planar support panel and having members for engaging a seat frame wherein said bladder member is secured to said support member.
9. The weight sensing pad of claim 1 wherein a bore is provided in substantially each of said plurality of small, substantially circular regions of bonding.
10. A weight sensing pad for controlling activation of an automobile airbag, said weight sensing pad comprising:
   a bladder member having an interior volume defined by first and second sheets perimetrically bonded together, wherein said bladder member is subdivided into a plurality of uniformly shaped cells in fluid communication with each other by a plurality of small, substantially circular regions of bonding between said first and second sheets; and
   a fluid contained within said interior volume of said bladder member, wherein said fluid is non-compressible and has a low freezing point.
11. The weight sensing pad of claim 10 wherein said uniformly shaped cells are substantially triangularly shaped.
12. The weight sensing pad of claim 10 wherein said weight sensing pad further comprises:
   a pressure activated electronic transducer in fluid communication with said bladder member and in electronic communication with an airbag control module, wherein said transducer is activated by a selected volumetric displacement of said fluid that provides a pressure change in said bladder member; and
   a pressure tube interconnected between and in fluid communication with said bladder member and said transducer.
13. The weight sensing pad of claim 10 wherein said weight sensing pad further comprises at least one securement region for facilitating securement of said weight sensing pad to an automobile seat.

14. The weight sensing pad of claim 10 wherein
said weight sensing pad further comprises at least one support member for engaging a seat frame, said support member being defined by a planar support panel and having members for engaging a seat frame wherein said bladder member is secured to said support member.

15. The weight sensing pad of claim 10 wherein
a bore is provided in substantially each of said plurality of small, substantially circular regions of bonding for providing ventilation through said weight sensing pad.

16. A weight sensing pad for an automobile seat, said weight sensing pad comprising:
a bladder member having an interior volume defined by first and second sheets perimetrically bonded together, wherein
said interior volume of said bladder member being subdivided into a plurality of substantially hexagonal shaped cells in fluid communication with each other by a plurality of bonded regions of said first and second sheets; and
a fluid contained within said interior volume of said bladder member.

17. The weight sensing pad of claim 16, wherein
a bore is provided in substantially each of said plurality of bonded regions.

18. The weight sensing pad of claim 16, further comprising
a pressure activated electronic transducer in fluid communication with said bladder member, wherein said transducer is activated by a selected volumetric displacement of said fluid that provides a pressure change in said bladder member.

19. The weight sensing pad of claim 16, wherein
said fluid is non-compressible.

20. The weight sensing pad of claim 16, wherein
said weight sensing pad further comprises at least one support member for engaging a seat frame, said support member being defined by a planar support panel and having members for engaging a seat frame wherein said bladder member is secured to said support member.

21. A weight sensing pad for an automobile seat, said weight sensing pad comprising:
a bladder member having an interior volume defined by first and second sheets perimetrically bonded together, wherein
said interior volume of said bladder member being subdivided into a plurality of substantially hexagonal shaped cells in fluid communication with each other by a plurality of small, substantially circular regions of bonding between said first and second sheets; and
a fluid contained within said interior volume of said bladder member.

22. A weight sensing pad of claim 21, wherein
said fluid is a non-compressible fluid.

23. A weight sensing pad of claim 21, wherein
said small, substantially circular regions of bonding are randomly spaced.

24. A weight sending pad of claim 21, wherein
a bore is provided in substantially each of said plurality of small, substantially circular regions of bonding for providing ventilation through said weight sensing pad.

* * * * *